(12) United States Patent
Loo (10) Patent No.: US 6,578,461 B1
(45) Date of Patent: Jun. 17, 2003

(54) SAW FENCE AND WORK FEED APPARATUS

(76) Inventor: Larry Y. S. Loo, 7861 E. Herndon Ave., Clovis, CA (US) 93611

( * ) Notice: Subject to any disclaimer, the term of this patent is extended or adjusted under 35 U.S.C. 154(b) by 37 days.

(21) Appl. No.: 09/897,522

(22) Filed: Jul. 2, 2001

Related U.S. Application Data (63) Continuation-in-part of application No. 09/313,671, filed on May 18, 1999, now abandoned.

(51) Int. Cl.[7] ................................................. B26D 7/06
(52) U.S. Cl. ........................... 83/423; 83/438; 83/477.2; 144/245.6; 144/425.1; 144/253.1; 198/749
(58) Field of Search .................. 83/435.15, 435.16, 83/435.17, 435.18, 435.19, 423, 435.2, 438, 437.2, 437.3–437.7, 821, 477.2, 410; 198/747–749, 734, 735.1, 735.3; 269/318; 144/245.6, 245.1, 253.1

(56) References Cited

U.S. PATENT DOCUMENTS

| | | | | | |
|---|---|---|---|---|---|
| 300,247 A | * | 6/1884 | Gordon | ....................... | 198/732 |
| 418,880 A | * | 1/1890 | Balsley | ..................... | 83/462 |
| 1,838,780 A | * | 12/1931 | Miller et al. | .............. | 144/245.5 |
| 3,901,109 A | * | 8/1975 | Mullinax, Sr. | .............. | 409/169 |
| 4,026,173 A | * | 5/1977 | Livick | .......................... | 83/421 |
| 4,246,943 A | * | 1/1981 | Cromeens | ................ | 144/245.6 |
| 4,271,958 A | * | 6/1981 | Stringfellow | ............... | 198/742 |
| 4,363,251 A | * | 12/1982 | Carlson | ....................... | 83/105 |
| 4,485,711 A | * | 12/1984 | Schnell | ........................ | 83/425 |
| 5,018,562 A | * | 5/1991 | Adams | ..................... | 144/253.1 |
| 5,031,496 A | * | 7/1991 | Lobash et al. | ................. | 83/107 |
| 5,373,878 A | * | 12/1994 | Walker | .................. | 144/250.16 |
| 5,662,019 A | * | 9/1997 | Denman | ....................... | 83/425 |

* cited by examiner

*Primary Examiner*—Kenneth E. Peterson
(74) *Attorney, Agent, or Firm*—David Kiewit (57) ABSTRACT

The combination of a rip fence and a workpiece pusher are provided for a table saw or shaper. A preferred workpiece pusher moves along a track having a central portion aligned with the feed direction and having two end portions skewed with respect to the feed direction so that the workpiece pusher retracts into the rip fence at both limits of its travel. This allows a sawyer to retract the workpiece pusher on the infeed side of a table saw and begin a ripping operation in which he or she manually pushes the workpiece into the saw blade until the trailing end of the workpiece is close enough to the saw blade that the workpiece pusher can be moved out of the fence to engage the trailing end of the stock. The pusher can then be used to push the workpiece the rest of the way past the blade. This apparatus also allows a woodworker to operate a table-mounted cutting tool without using a workpiece pusher of the invention that is installed on that table. In this mode of operation, if the workpiece pusher is incidentally engaged by the workpiece, the workpiece pusher does not jam the workpiece into the tool or into the rip fence, but is merely pushed to the outfeed side of the table where it retracts within the rip fence.

7 Claims, 5 Drawing Sheets

SAW FENCE AND WORK FEED APPARATUS

CROSS REFERENCE TO RELATED APPLICATIONS

This application is a continuation-in-part of U.S. Ser. No. 09/313,671, filed May 18, 1999 and now abandoned.

BACKGROUND OF THE INVENTION

1. Field of the Invention

This invention generally relates to cutting apparatus and method comprising means to convey a workpiece relative to a tool station; and more specifically relates to a pusher preferably built into a rip fence for a table saw.

2. Background Information

Table saws having a portion of a motor-driven circular blade extending upwards through a slot in a saw table are commonly used for rip-sawing narrow strips of wood from a large stock piece. This practice is inherently dangerous and the danger is somewhat reduced by the use of any one of a number of known rip fences. Each of these fences has a straight, flat guide face and can be clamped or locked to the saw table so that the guide face is parallel to the plane of the saw blade. The simplest rip fence may consist of a straight, flat, wooden board clamped to the top of the saw table with individual clamps. The usual, mass-produced, rip fence is fabricated from steel. It can be slid toward or away from the blade on guide rails attached to the front and rear of the saw table. The front of this fence is equipped with a lever for locking both front and rear ends of the fence to the guide rails when depressed.

The manner of rip-sawing wood by hand is the same no matter what kind of rip fence is utilized. The woodworker adjusts the distance between the guide face and the adjacent side of the saw blade to equal the width of the piece he wishes to rip off. He clamps or locks the fence to the saw table in the desired position with the fence parallel to the saw blade and turns the saw on. The woodworker then begins to advance the stock piece of wood into the rotating saw blade by pushing the stock with both hands. As he does this, he must simultaneously hold the stock piece firmly down on the saw table while guiding one straight edge of the stock piece along the rip fence's guide face. That is, he must press the stock piece down on the table and also push it laterally against the rip fence as he advances the stock piece toward the saw blade. To keep his fingers from being cut by the rotating blade, he must keep them a safe distance from the blade at all times. If the desired width of cut exceeds about two inches, the woodworker may feel confident enough to push the rear end of the wood past the blade with one or more fingers of his or her dominant hand, while reaching beyond the tool with the other hand so as to exert pressure on the cut end to hold it against the table and against the guide face of the rip fence. As the blade cuts through the wood, his finger (or fingers) must enter the narrow space between rip fence and saw blade as he pushes the wood past the blade. When using this technique to rip off very narrow pieces, however, there is always the danger that the blade will cut a finger.

While rip-sawing pieces of any width off a stock piece, an accident called "kickback" can occur if the woodworker accidentally allows the already cut end of the stock piece to angle away from the guide face by even a tiny amount. If the cut end is caught by the far, or outfeed, end of the saw blade, where the blade's teeth are rising through the table's slot, the rising and backward-moving teeth snag the wood piece, kicking it off the table and towards the woodworker. The hand grasping the cut end often is pulled back into the saw blade and badly lacerated by the rotating blade. A wood piece may be kicked back with such force that it may itself lacerate a hand or drive splinters into the hand.

To minimize the risk of cutting his hands, the experienced woodworker may use a push stick instead of his fingers to advance the stock piece. As the push stick traverses the narrow corridor between saw blade and fence, however, it may accidentally contact the rotating blade. When this occurs, the push stick can itself be kicked backward into the hand holding it. This sometimes results in a lacerated hand or, at the very least, a bruised one. Push sticks have one major disadvantage—when using one it is difficult to keep the stock piece pressed laterally against the guide face of the fence while it is being pushed forward and past the blade. If the stock piece is allowed to drift off the fence's guide face at the infeed end, the ripped piece will not have a uniform width along its length; if the stock is allowed to drift off that guide face at the outfeed end, a kickback may occur.

Commercially available hold-down devices, such as those sold under the trade names of Shop Helper (™), Ripstrate (™), or Leichtung(™), can be clamped to a rip fence to aid in rip-sawing wood. These devices tend to hold the stock piece down and press it laterally against the rip fence. However, a push stick must still be used to advance the wood into the blade toward the end of the cut. The arms of the various hold-down devices traverse the corridor between rip fence and saw blade. The arms, therefore, are obstructions that prevent a push stick from pushing the wood all the way past the saw blade. When rip-sawing with one of these devices clamped on the rip fence, the woodworker pushes the stock piece as far into the blade as he safely can with his hands or a push stick. Then, to complete the cut, he must walk around to the outfeed end of the table saw, grasp the cut end and pull the stock piece through the saw blade.

There are other devices, such as featherboards, which can be used in both horizontal and vertical positions to assist in the ripping operation. A horizontal featherboard can be clamped to the top surface of the table saw to push the stock piece against the guide face of the rip fence. It can only be positioned at the infeed end of the saw (if one is positioned at the outfeed end, it will squeeze the saw kerf and may cause a kickback). Vertically positioned featherboards can be used to hold down the stock piece down on the table. These may be placed at both infeed and outfeed ends. These vertically positioned featherboards usually are clamped to the rip fence, where they obstruct the passage of a push stick. A featherboard will help hold the stock piece down on the saw table. It cannot be set up to press the piece laterally against the rip fence, however. Because featherboards are clamped to the rip fence, they also obstruct the passage of a push stick.

Expensive, motor-powered, rubber-tired feeders may be purchased for rip-sawing wood. A power feeder will simultaneously advance the workpiece while holding it down and pressing it laterally against the rip fence's guide face. They work well, but can require considerable set-up and adjustment time for accurate rip-sawing. Commercial woodworking shops find power feeders invaluable for safely rip-sawing a large number of pieces of identical width, but most amateur woodworkers cannot afford them. Moreover, a woodworker who does use one may prefer to use a simple push stick when rip-sawing only one or two pieces. To rip-saw off very narrow pieces, the power feeder sometimes must be lowered down so that it straddles the saw blade. During subsequent rip-sawing the blade will cut partly into some of the rubber tires.

Although the use of a table saw is of considerable concern for the invention, and is generally used as an example hereinafter, it may be noted that similar concerns arise with many other power woodworking tools in which a workpiece is held against a guide member as it is conveyed along a feed direction to a tool station. For example, a shaper, which commonly has a tool bit spinning at four to five times faster than a table saw blade, presents many of the same hazards as are encountered in the use of a table saw.

Notable among patent references in this area are the following:

In U.S. Pat. No. 5,662,019 Denman teaches a workpiece pusher that is retractable from a workpiece-engaging position by rotation about an axis parallel to a workpiece feed direction. It is notable that if Denman's pusher is allowed to rotate while a workpiece is being sawn, the rotation tends to push the workpiece away from the rip fence. Moreover, if Denman's pusher is in its workpiece engaging position and a sawyer fails to notice the pusher's orientation before beginning to rip a workpiece, the cut end of the workpiece will push the pusher to its outfeed limit of travel, at which point the sawing operation will have to be stopped to free the outfeed end of the workpiece.

In U.S. Pat. No. 5,018,562 Adams teaches a woodworking fence comprising a dovetail slot running lengthwise along its top surface. A movable stop or push fixture can be slid along the length of the fence with its dovetail protrusion engaged in the dovetail slot of the fence. This push fixture is used to guide wood pieces held at right angles to the woodworking fence. Adams' fixture cannot be used for full-thickness rip-sawing operations of narrow pieces inasmuch as the saw blade would cut through or into the bottom of his pusher.

In U.S. Pat. No. 4,485,711 Schnell discloses a straddle block having a vertically adjustable leg adapted to slide along the top surface of a table saw's rip fence. In rip-sawing a piece of wood stock the straddle block is pushed forward by hand along the rip fence; a stepped-down portion of the leg engages the trailing end of the wood stock piece and the wood advances along with the straddle block. Although the bottom edge of the adjustable leg holds the workpiece down to the saw table; the block cannot press the wood laterally against the guide face of the rip fence to ensure that the ripped piece will be of uniform width. Moreover, devices, such as the Shop Helper(™) or Ripstrate(™), cannot be used with Schnell's straddle block because they impede its passage along the rip fence's length. Moreover, if Schnell's pusher is in its workpiece engaging position and a sawyer fails to notice the pusher's orientation before ripping a workpiece, the cut end of the workpiece will push the pusher to its outfeed-limit of travel, at which point the sawing operation will have to be stopped to free the outfeed end of the workpiece.

In U.S. Pat. No. 4,026,173 Livick teaches the use of a guide rail on the top surface of an adjustable fence. As the guide rail is pushed along the length of the fence, sharp-pointed work engaging and feeding members advance wood pieces into the saw blade on a table saw. To provide adequate force to advance a wood piece, the points of the members must penetrate the workpiece's top surface. This is a significant disadvantage inasmuch as the top surface of every ripped piece of wood is marred by puncture marks created by the points of the engaging and feeding members. If the rip-sawing slows down abruptly when the blade encounters a knot or dense area of wood, the points may skid along the top surface as the guide rail continues forward at a uniform rate. When this happens, long linear scratches can be produced on the top surface of a ripped piece of wood. Thus Livick's wood feeding device cannot be used for the rip-sawing of smoothly-planed wood; it will produce disfiguring puncture marks or linear scratches on the top surfaces of ripped pieces.

Thus, it can be seen that current and past rip fence designs have not fulfilled the need for a device that will allow the rip-sawing of narrow pieces of wood safely.

BRIEF SUMMARY OF THE INVENTION

The invention provides a method and apparatus for conveying a workpiece relative to a tool station. A preferred embodiment of the apparatus comprises a movable portion for pushing the workpiece into the tool and a static workpiece-guiding member. In most preferred embodiments, the invention provides the combination of a rip fence and a workpiece pusher for use with a table saw or shaper, wherein the workpiece pusher is adapted to move along a feed direction (e.g., parallel to a saw blade) for a predetermined distance and is further adapted to move away from the feed direction near at least one end of the predetermined distance. In a preferred embodiments the workpiece pusher is adapted to move away from the feed direction at both ends of the predetermined distance.

A preferred apparatus of the invention allows a sawyer to move the workpiece pusher away from a table saw blade at the infeed side thereof, begin a ripping operation in which he or she manually pushes the workpiece into the saw blade until the trailing end of the workpiece is close enough to the saw blade that the workpiece pusher can engage the trailing end and then be used to push the workpiece the rest of the way past the blade. Moreover, apparatus of this sort allows a sawyer or woodworker to operate a table-mounted cutting tool without using a workpiece pusher of the invention that is installed on the table he is using. In this mode of operation, if the workpiece pusher is incidentally engaged by the leading edge of the workpiece, the workpiece pusher does not jam the workpiece into the tool or into the saw fence or other static workpiece-guiding member.

Some embodiments of the invention comprise a workpiece push tab conveyed by a carriage so that the tab moves along a first portion of the surface of a work table in a work-feeding direction and away from the work-feeding direction (i.e., along a line parallel to the surface but skewed with respect to the feed direction) over at least a second, and commonly a third, portion of the surface.

A preferred workpiece pushing apparatus of the invention comprises a workpiece push tab, a tab carriage, and a track. A preferred push tab comprises a piece of relatively soft metal, such as aluminum, which is removably attached adjacent one of its ends to the carriage so as to permit easy replacement. The preferred track is disposed within a rip fence attached to a saw table. This preferred track comprises an infeed end portion, a workpiece pushing portion, and an outfeed end portion; where the infeed and outfeed end portions are skewed with respect to a feed direction (e.g., to the plane of a saw blade) and where the workpiece pushing portion is parallel to the feed direction. A push handle may be fixedly attached to the tab carriage so that it extends away from the tool. In this case, the hand of a sawyer using the handle is further from the saw blade than is the track. In a preferred embodiment, the workpiece pushing apparatus is combined with a rip fence having a longitudinal slot running horizontally along its vertical guide face so that the push tab extends through the slot over a portion of its range of motion. In some embodiments, the rip fence may comprise a cover portion extending over the track, in which case the cover portion may also have a longitudinal slot through which the optional push handle passes.

Some preferred embodiments provide a rip fence having a conventional smooth and unencumbered top, but having a workpiece pusher protruding through the guide face of the rip fence adjacent a lower edge of the face. An advantage of these embodiments is compatibility with existing anti-kickback safety devices that may be attached to the upper portions of a rip fence and that act to hold the workpiece down to the table and against the face of the rip fence.

An advantage of a preferred embodiment of the invention is that it allows a sawyer to operate the saw while paying no heed to the presence of the workpiece pusher of the invention. Although this mode of operation deprives the sawyer of other advantages of the invention, such operation does not pose the jamming hazard that a sawyer would encounter by ignoring a prior art pusher/fence combination while feeding stock into the pusher portion of that prior art combination. Thus, workpiece feeding apparatus may comprise a pushing member movable from an infeed side of a woodworking tool to an outfeed side thereof, the pushing member adapted to extend outwardly from a vertical guide face of a rip fence and into a space between the rip fence and a woodworking tool when the pushing member is most nearly adjacent the tool, the apparatus characterized in that it does not impede the motion of a workpiece placed on the table more distal from the tool than the pushing member and pushed along the vertical guide face from the infeed side of the tool to the outfeed side thereof by means not comprising the workpiece feeding apparatus.

Although it is believed that the foregoing recital of features and advantages may be of use to one who is skilled in the art and who wishes to learn how to practice the invention, it will be recognized that the foregoing recital is not intended to list all of the features and advantages of the invention. Moreover, it may be noted that various embodiments of the invention may provide various combinations of the hereinbefore recited features and advantages of the invention, and that less than all of the recited features and advantages may be provided by some embodiments. Although it is believed that the foregoing recital of features and advantages may be of use to one who is skilled in the art and who wishes to learn how to practice the invention, it will be recognized that the foregoing recital is not intended to list all of the features and advantages. Moreover, it may be noted that various embodiments of the invention may provide various combinations of the hereinbefore recited features and advantages of the invention, and that less than all of the recited features and advantages may be provided by some embodiments.

DETAILED DESCRIPTION OF THE INVENTION

Figure 1:
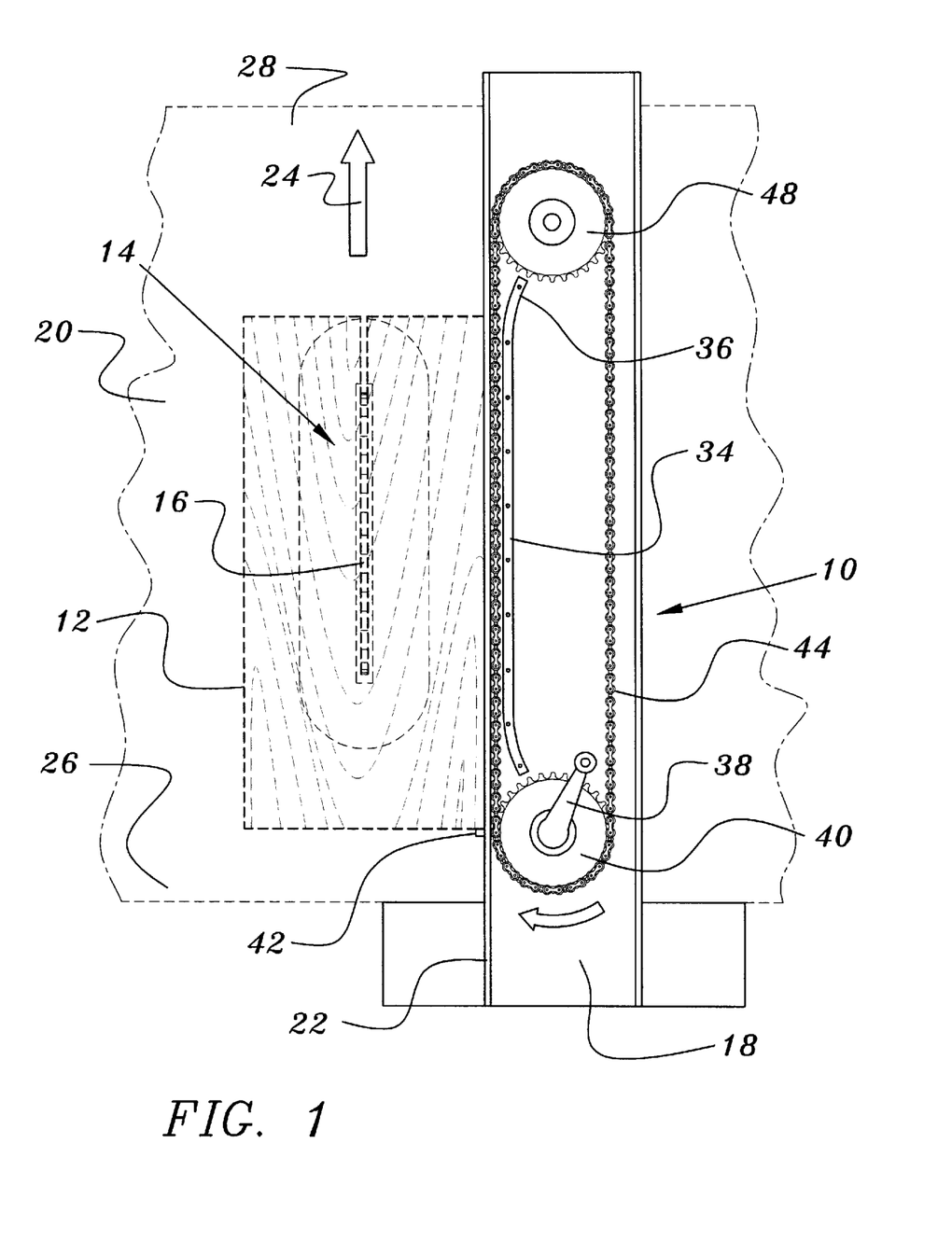
FIG. 1 is a plan view of a saw table having a pushing mechanism installed thereon.

Turning initially to FIG. 1, one finds apparatus for conveying a workpiece 12 to a tool station 14 (e.g., to a circular saw 16 or shaper 17) disposed at a stationary tool station. In this arrangement a rip fence 18 or other workpiece guide member is clamped or otherwise affixed to a saw table 20 so that the spacing between the saw blade and the rip fence is equal to a selected cut width, and so that a guide face portion 22 of the rip fence is parallel to the feed direction 24. The workpiece 12 is then placed on an infeed side 26 of the tool and pushed along the guide face 22 into the cutting tool station 14 so as to make a cut. The cut workpiece may be removed from an outfeed side 28 of the saw table.

Apparatus of the invention 10 comprises a workpiece pushing member 30 that engages the workpiece 12. The pusher 30 is adapted to follow a pre-selected bent or curved path, which is preferably a guide surface of a track 32 attached to the work table 20 or to some other suitable support. The guide surface comprises at least a first portion 34 parallel to the feed direction, and a second portion 36 that is skewed with respect to the feed direction.

In the arrangement depicted in FIG. 1, a workpiece 12 could be cut by placing it on the infeed side 26 of the saw table 20 with one side of the workpiece 12 abutting the rip fence 18, and by then pushing the workpiece 12 into the saw blade until the trailing end of the workpiece 12 was close enough to the saw blade that the pusher 30 could be placed behind the workpiece 12 so that one end of the pusher 30 engaged the trailing edge of the workpiece 12 in a conventional fashion. The sawyer could then turn a crank handle 38 attached to a drive sprocket 40 until a push tab 42 attached to a drive chain 44 emerged through a slot 46 in the face of a rip fence 18. Continuing to turn the crank handle 38 would thus act to convey the workpiece 12 past the saw blade to the outfeed side of the table, where the push tab 42 would be withdrawn through the slot 46 as that portion of the drive chain 44 to which it was attached moved around a second sprocket 48.

Figures 2, 3:
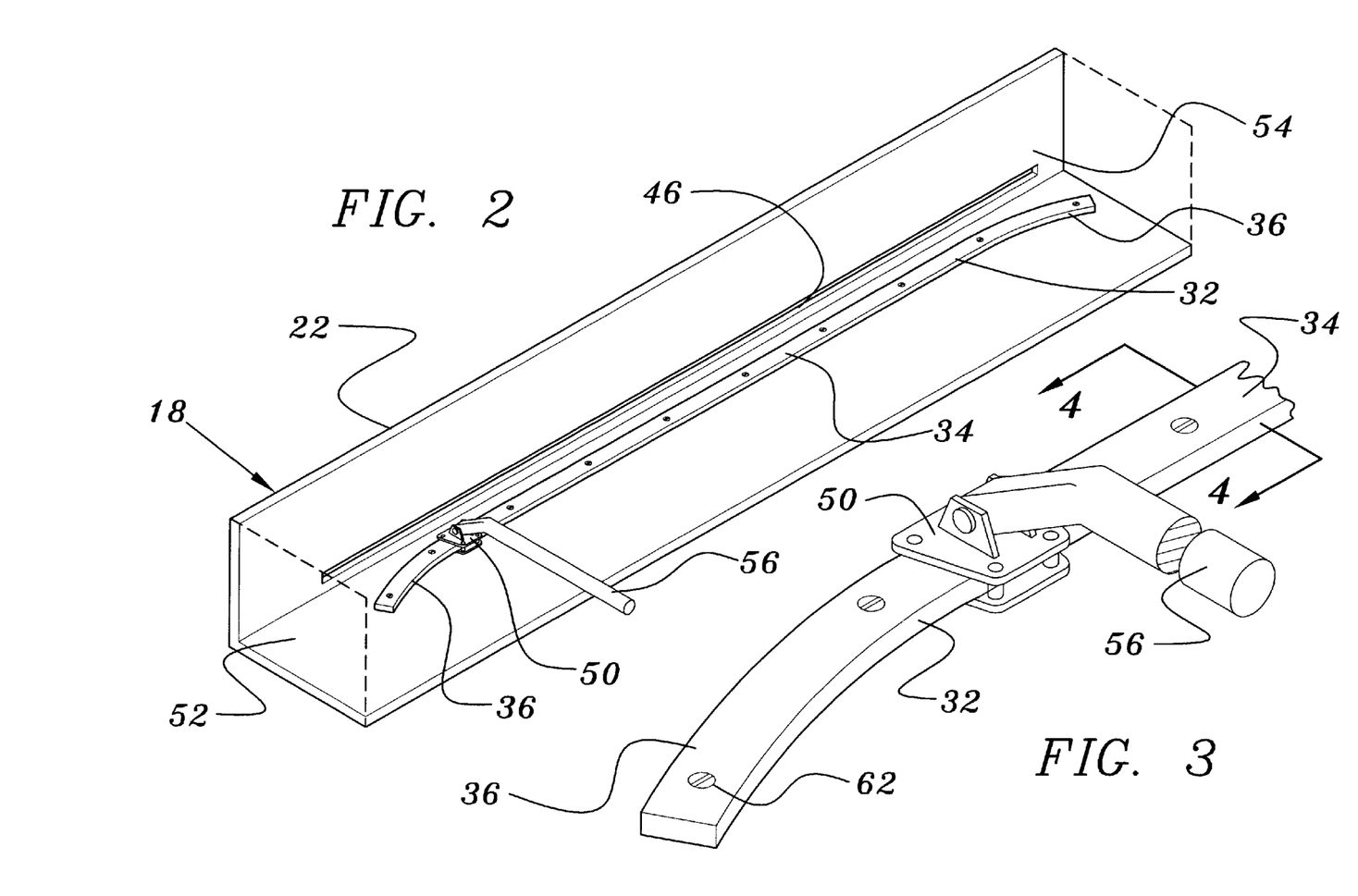
FIG. 2 is a partial perspective view of an embodiment of the invention.
FIG. 3 is a detail view of a track and carriage of the embodiment of FIG. 2
Figure 4:
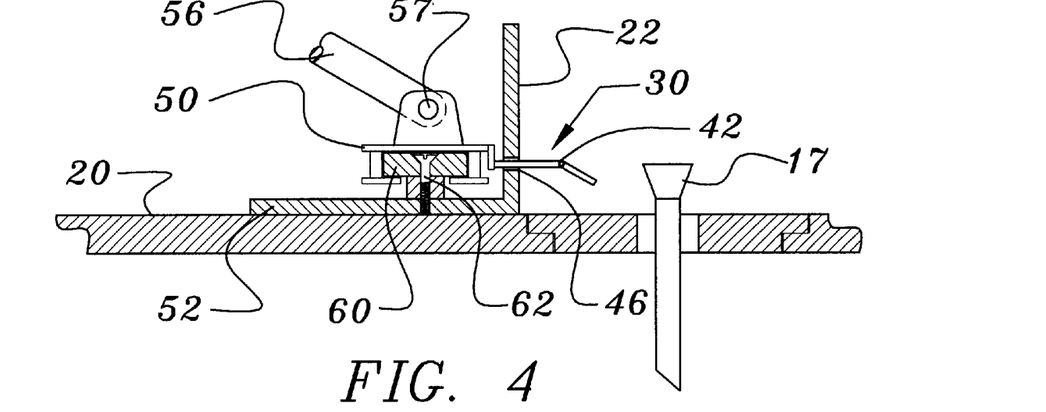
FIG. 4 is a cross sectional view of the apparatus of FIG. 2, the view taken as indicated by 4—4 in FIG. 2.

In an embodiment of the invention depicted in FIGS. 2–4 of the drawing, the pusher 30 to comprises a tab 42 fixedly attached to a carriage 50 that slidably engages a track 32 having smoothly curved infeed and outfeed ends. The preferred track 32 is fixedly attached to a bottom 52 of a rip fence 18 having a slotted guide face, where the slot 46 is aligned parallel to the bottom 52 of the rip fence. The length of the tab 42 is selected to be long enough so that when the carriage 50 is on a first, straight, portion 34 of the track 32, the end of the tab 42 distal from the carriage 50 extends through the slot 46 into a position in which it can engage a workpiece 12. The tab 42 is selected to be short enough so that when the carriage 50 is moved from the straight portion of the track 32 to either of the curved ends, the tab 42 is thereby retracted through the slot 46 into an interior portion 54 of the rip fence and out of its workpiece-engaging position.

Providing a skewed path 36 at both the infeed and outfeed ends of the rip fence 18 aids in the operation of preferred embodiments of the invention. A sawyer can first pull the carriage 50 (e.g., by use of a push handle 56) to the infeed end 26 of the track 32 so that the push tab 42 is retracted within the rip fence 18, and can then place a workpiece 12 on the infeed side of the saw table and manually push it into the saw blade until the trailing edge of the workpiece 12 is adjacent an infeed end 26 of the slot 46 in the rip fence 18. The sawyer can then grasp the push handle 56 and push it towards the saw blade to cause the push tab 42 to emerge through the slot 46 into its work-engaging position, and can push the work past the blade by continuing to move the pushing mechanism along the feed direction. If the sawyer ignores the pushing mechanism and begins a cut when the push tab 42 is in a workpiece engaging position, the leading edge of the workpiece 12 will engage the tab 42 and push it past the saw blade 16 to a point at which the tab retracts into the rip fence 18 as the carriage 50 is guided along the outfeed curved portion of the track 32. Thus, a preferred embodiment of the invention provides a means of conveying a workpiece 12 into a tool 14, where the conveying means, if misused, does not present a jamming hazard.

Although one may employ a generally flat and curved track 32 fixedly attached to the bottom of a rip fence 18 which can then be moved in a conventional fashion to and from in a direction perpendicular to the feed direction in order to set the cut width, a person skilled in the art will realize that other configurations are possible. For example, one could easily attach a track 32 to another surface (e.g., the top 58) of a rip fence so that the carriage 50 depended therefrom. Such a structure would provide the same operational features. Moreover, it will be realized that there are many known alternatives to the preferred arrangement of a track 32 comprising a body 60 having a generally rectangular cross section, the body 60 attached to a portion of the rip fence 18 in a spaced apart relationship (e.g., by the depicted use of machine screws 62 and standoff spacers 64) in combination with a carriage 50 adapted to engage both the top and bottom surfaces of the track 32. One could, as depicted in the preferred embodiment of FIG. 7, use a rip fence 18 having a thick bottom and employ a groove cut into the bottom of the rip fence as the track 32B.

In initial models of the pushing apparatus, the track 32 was cut from a ¼" thick sheet of high-density polyethylene mounted on aluminum spacers 64 so as to maintain a spacing of about ⅛" between the bottom of the track 32 and the bottom 52 of the rip fence, which was made from a 2"×2"×⅛" extruded aluminum channel. The carriage 50, or guide block, used with this track 32 was made from small pieces of ¹⁄₁₆" steel sheet and from short lengths of ⅛" diameter welding rod. This sort of carriage 50 could be molded from a dense, relatively strong, polymeric material selected for good lubricity so as to prevent binding or jamming when pushing the carriage 50 along the track 32. The push tab 42 is preferably a relatively soft metal or other material (which will reduce both saw damage and the risk of sawyer injury when a push tab 42 is accidentally shoved into a saw blade) that is removably mounted to the carriage 50 so that a sawyer can match the tab length to a selected cut width. Those skilled in the art will recognize that many design and material choices can be made in optimizing the carriage 50 and push tab 42 of the invention, and that such configurations may comprise a slanted tab (as depicted in FIG. 4) for use in cutting thin stock.

Figure 5:
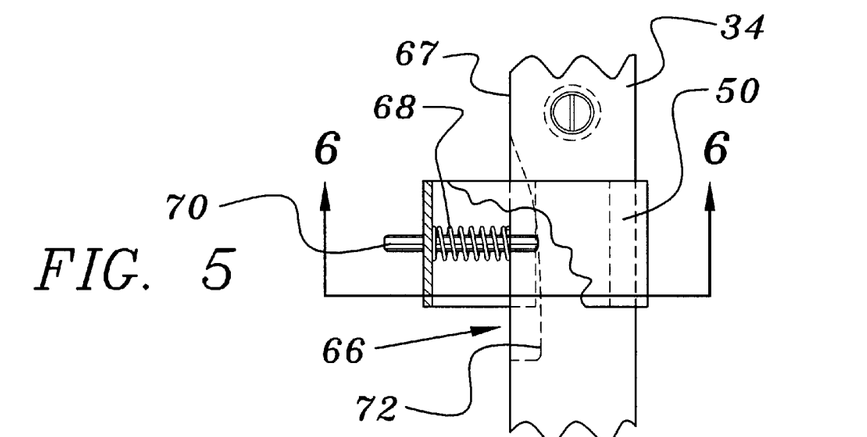
FIG. 5 is a partly cut-away view of an embodiment of the invention that uses a straight track having a curved guide surface.
Figure 6:
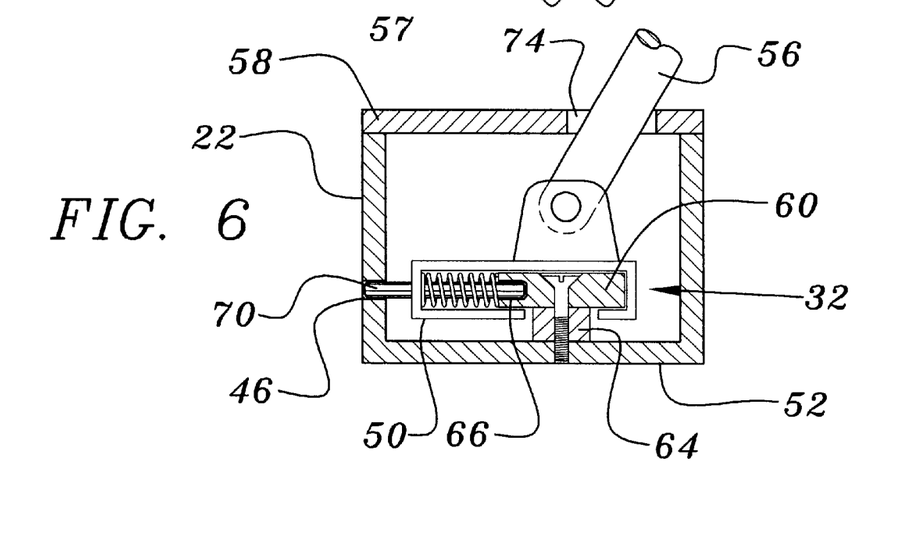
FIG. 6 is a cross-sectional view taken as indicated by 6—6 in FIG. 5, where the track and carriage are shown mounted within a slotted rip fence.

Although some embodiments employed a track 32 having smoothly curved ends 36, one can also construct embodiments of the invention that have a curved guide surface 66 disposed on an otherwise straight track 32. An example of such a structure is depicted in FIGS. 5 and 6 where a bias spring 68 urges a pusher member, such as the pusher pin 70 into an abutting contact with the guide surface 66. When the carriage 50 is disposed on a first portion of the track 32, the guide surface 66 may run along the outer margin 67 of the track 32 so that it is close enough to that one of the vertical walls 21 of rip fence 18 that has the guide face 22 as its outer surface in order for the pusher pin 70 to extend outwardly through the slot 46 in the guide wall 22. When the carriage 50 is pushed towards either the infeed or outfeed limit of its travel, the pusher pin 70 bears on a second portion 72 of the guide surface that is recessed into the track 32 so that the pusher pin 60 is retracted.

Some embodiments of the invention provide a push handle 56 attached to and extending either upwardly or outwardly from the carriage 50. As depicted in FIGS. 4 and 6, the handle 56 can fastened with a pin 57, or otherwise hingedly attached to the carriage 50 in order to provide a sawyer with a range of positions, some of which he or she may find more comfortable than others. Moreover, a preferred embodiment of the invention may comprise a cover 58 for the rip fence, with a handle slot 74 provided in the cover for the push handle 56. This arrangement has been found to be useful in keeping sawdust and other debris from fouling the track 32. Although this cover may serve as a top lid for the rip fence assembly (e.g., as depicted in FIG. 6), one may also have a structurally solid top on the rip fence and bring the push handle 56 out through a slit in that side of the rip fence assembly distal from the saw blade. This arrangement provides a rip fence 18 structure more compatible with the use of existing "anti-kickback" and hold-down devices that are often mounted to the top of the rip fence.

Figure 7:
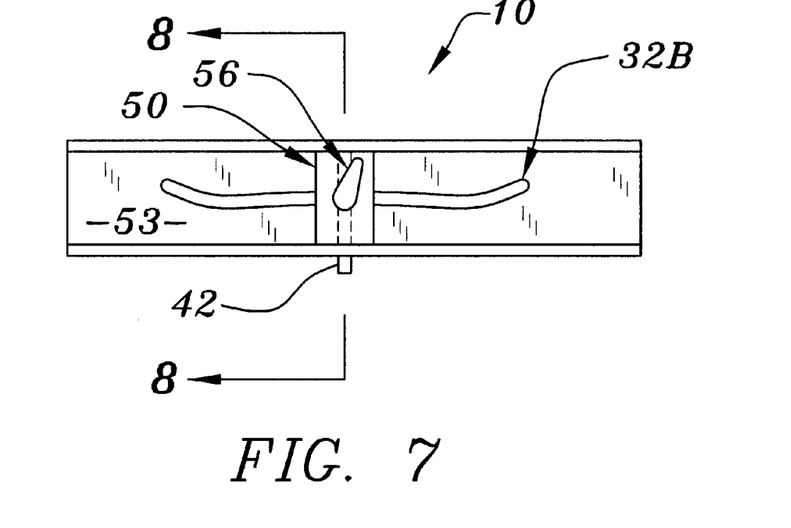
FIG. 7 is a plan view of a preferred apparatus of the invention comprising a rip fence having a track cut into a bottom wall thereof.
Figure 8:
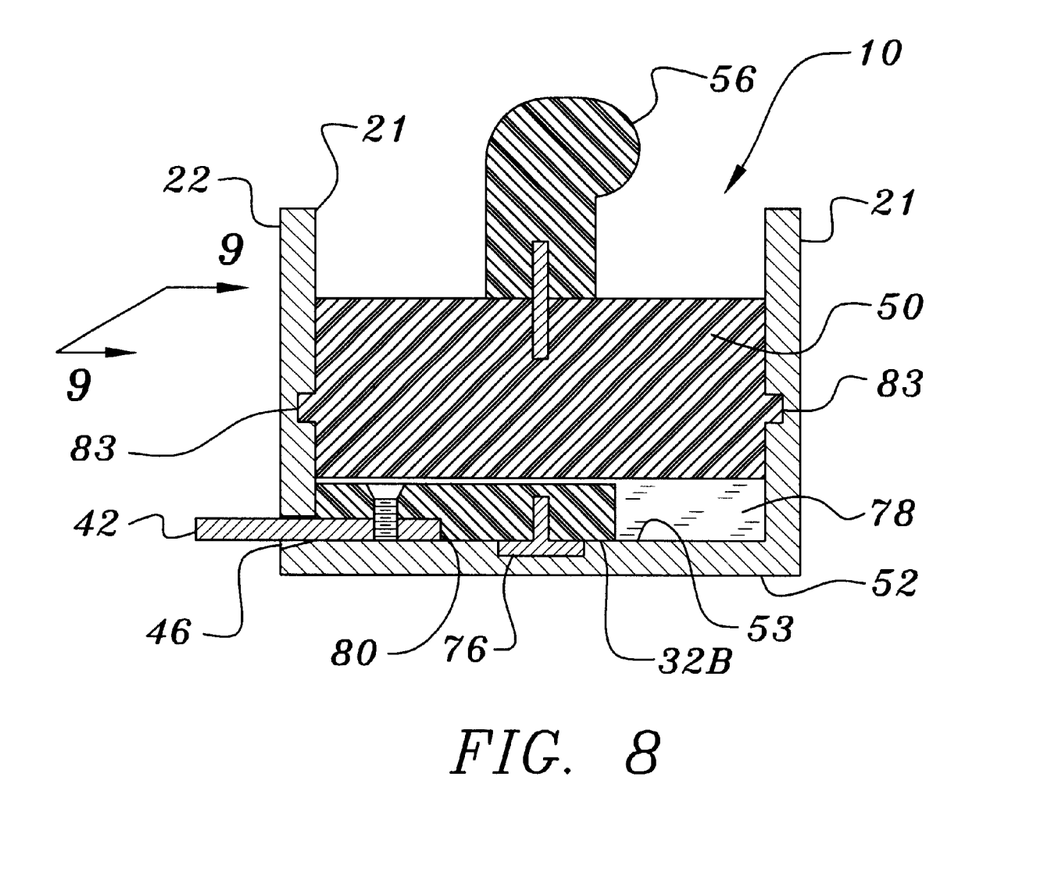
FIG. 8 is a cross-section, taken as indicated by 8—8 in FIG. 7, of a preferred carriage, push tab, and track.
Figure 9:
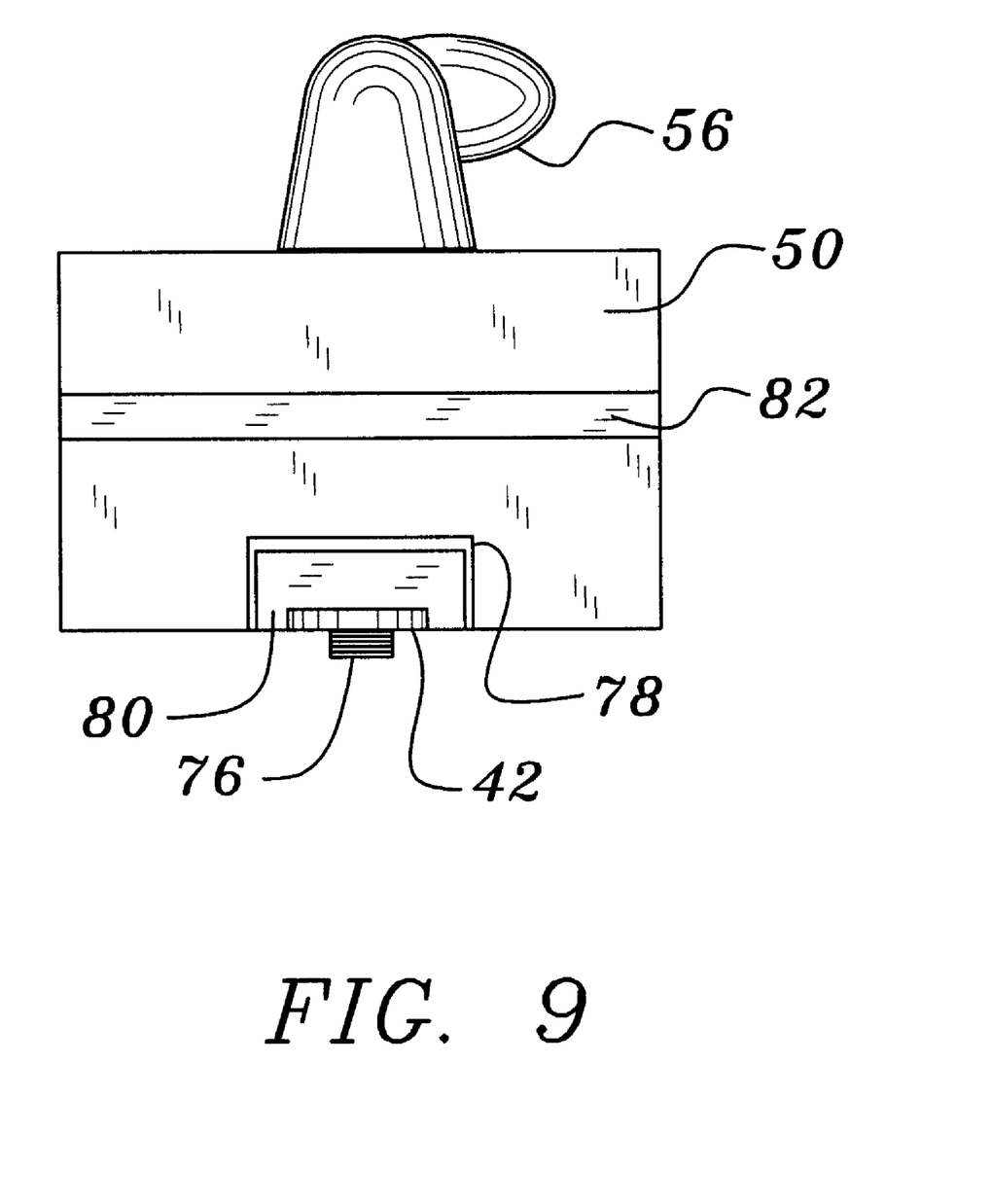
FIG. 9 is an elevational view of the carriage of FIG. 7, the view taken as indicated by 9—9 in FIG. 8, where the rip fence portion of the apparatus has been removed in order to more clearly depict the carriage, pusher, and track-follower.

Turning now to FIGS. 7 through 9, one finds a preferred embodiment of the invention that uses a rip fence 18 having a track 32B machined into an upper surface 53 of a bottom wall 52 of the rip fence, and two straight tracks cut into the vertical walls of the rip fence. The preferred carriage 50 used in this embodiment comprises two lateral track-engaging portions 82 that fit into the two straight carriage tracks 83 formed in the inner surfaces of the side walls 21 of the rip fence and hold the carriage in a fixed vertical position. Note that the carriage, in this embodiment, does not follow the guide track 32B, but reciprocates along the axis of the rip fence, which is, of course, parallel to the feed direction. A cross-slide keyway 78 is formed in the bottom of the carriage 50 and a pusher 30 comprising a cross-slide key 80, a track-follower, or bushing 76, and a push tab 42 removably attached to the cross-slide key (e.g., by the screw depicted in FIG. 8) is slidably interfitted into the keyway 78. Thus, when the carriage is reciprocated, the track-follower bushing 76, which engages the track, follows the guide track 32B and causes the cross-slide key 80 to reciprocate along a path transverse to the axis of the rip fence.

In a preferred embodiment the carriage 50 of FIGS. 7 through 9 is machined from a durable plastic material, such as delrin, teflon, or nylon and the cross-slide key 80 comprises a plastic body of one of the same materials, the body having a pusher tab 42 removably attached to it by means such as a recessed screw, the body further having a metal track-follower 76 inserted into a bottom surface so that the track-follower can engage the guide surface provided by the recessed track 32B that is formed into the top surface of the bottom wall of the rip fence. Those skilled in the art will recognize that there are many other approaches to making the carriage 50 and cross-slide key 80, and that the cross-slide key could, for example, be molded as a single piece of plastic comprising an integrally formed pusher tab and track follower. Alternately, of course, the cross-slide key could have an integrally molded track follower, but allow for the removable attachment of a pusher tab.

To use the preferred apparatus of FIGS. 7–9, a sawyer pulls the carriage 50 towards the infeed end of the rip fence 18. The carriage 50 stops when the track follower 76 reaches the infeed end of the track 32B. The length of the push tab 42 is selected so that the tab is entirely within the rip fence and does not protrude through the slot 46. With the apparatus in this limiting infeed position, a workpiece is placed on the table and pushed into the saw until the trailing edge of the workpiece passes the infeed end of the slot. The carriage is then pushed towards the outfeed side of the table, forcing the track-follower 76 to move along the skewed infeed end of the track 32B and onto the portion of the track parallel to the feed direction. As the track-follower moves closer to the slotted guide face of the rip fence, the cross-slide key slides in a direction transverse to the feed direction and moves the push tab through the slot into operative engagement with the trailing edge of the workpiece.

It may be noted that many other arrangements may be used to provide a pusher 30 that moves along a feed direction 24 over part of a work table 20 and that moves toward or away from that feed direction over other portions of the work surface. For example, one could attach a push tab to a carriage 50 adapted to move along a feed screw (not shown) aligned with the feed direction 24. In this case the push tab would be mounted to the carriage so that it could move laterally across the carriage and be biased into a work engaging position by a spring. A vertically disposed pin (not shown, but strictly analogous to the follower tab 76 in function) could be fixedly attached at its base to the push tab and could have its upper end riding in a pin guide slot (not shown, but analogous in shape and function to the incised track 32B) that curved away from the feed direction at both the infeed and outfeed ends of the table. Thus, when the carriage reached a portion of the table where it is desirable to retract the push tab, the vertically disposed pin would encounter a curved portion of the guide slot that would act to retract the push tab into the rip fence as carriage motion continued.

Although the present invention has been described with respect to several preferred embodiments, many modifications and alterations can be made without departing from the invention. Accordingly, it is intended that all such modifications and alterations be considered as within the spirit and scope of the invention as defined in the attached claims.

What is claimed is:

1. An apparatus for feeding a workpiece across a top surface of a table along a feed direction from an infeed side of a tool to an outfeed side thereof, the apparatus comprising:

a rip fence having a flat, vertical face parallel to the feed direction, the vertical face having a horizontal slot therethrough, the rip fence comprising a track having a first guide surface portion parallel to the feed direction and extending from the infeed side of the tool to the outfeed side thereof, the track further comprising a second guide surface portion skewed with respect to the feed direction;

a carriage connected to the rip fence for slidable motion from the infeed side of the tool to the outfeed side thereof; and a pusher sequentially abutting the first and second guide surface portions and slidably connected to the carriage by means allowing the pusher to translate transverse to the feed direction so that a portion of the pusher extends outwardly through the slot when the pusher abuts the first portion of the guide surface, said portion of the pusher not extending through the slot when the pusher abuts the second guide surface portion.

2. The apparatus of claim 1 wherein the tool is a woodworking tool.

3. The apparatus of claim 1 wherein:

the rip fence comprises a bottom wall having an upper surface internal to the rip fence and a flat lower surface abutting the top surface of the table when the apparatus is in use;

the track is formed into the upper surface of the bottom wall of the rip fence;

the carriage comprises a cross-slide way transverse to the feed direction; and the pusher comprises a cross-slide key slidable within the cross-slide way, the pusher further comprising a track-follower engaging the track.

4. An apparatus for feeding a workpiece along a feed direction on a top surface of a table from an infeed side of a woodworking tool to an outfeed side thereof, the apparatus comprising:

a rip fence having a flat bottom wall and a flat slotted vertical side wall having a horizontal slot therethrough, the horizontal slot parallel to the feed direction; the bottom wall having an upper surface and a lower surface, the lower surface of the bottom wall abutting the top surface of the table when the apparatus is in use, the upper surface of the bottom wall having a guide track formed therein, the guide track comprising a first portion parallel to the slot and at least a second portion skewed with respect to the slot;

a carriage abutting the at least one vertical wall of the rip fence, the carriage movable along a line parallel to the feed direction, the carriage comprising a cross-slide key way transverse to the feed direction; and a workpiece pusher comprising a cross-slide key body portion fitting within the cross-slide key way and slidable transverse to the feed direction, the workpiece pusher further comprising a track follower engaging the guide track for motion therealong, the workpiece pusher further comprising a push tab extending through the slot into a workpiece engaging position when the track follower engages the portion of the guide track parallel to the slot.

5. The apparatus of claim 4 wherein:

the rip fence comprises a second vertical sidewall, each of the two sidewalls having a respective carnage track formed in a respective inner surface thereof;

the guide track comprises second and third guide surface portions, the second guide surface portion disposed on the infeed side of the tool and skewed with respect to the feed direction, the third guide surface portion disposed on the outfeed side of the tool and also skewed with respect to the feed direction;

the carriage comprises two lateral track-engaging portions for engaging respective carnage tracks; and the push tab is removably attached to the cross-slide key body.

6. The apparatus of claim 4 wherein the rip fence comprises two vertical side walls, each of the vertical side walls comprising a respective carriage track parallel to the feed direction, and wherein the carriage further comprises two carriage track engaging portions.

7. The apparatus of claim 4 wherein the at least one track portion skewed with respect to the feed direction comprises two skewed portions, one of the two skewed portions disposed adjacent an infeed end of the rip fence and the second of the two skewed portions disposed adjacent an outfeed end of the rip fence.

* * * * *